3,141,884
PROCESS FOR THE PRODUCTION OF MELAMINE USING THE SPECIFIC RESISTANCE HEAT OF UREA

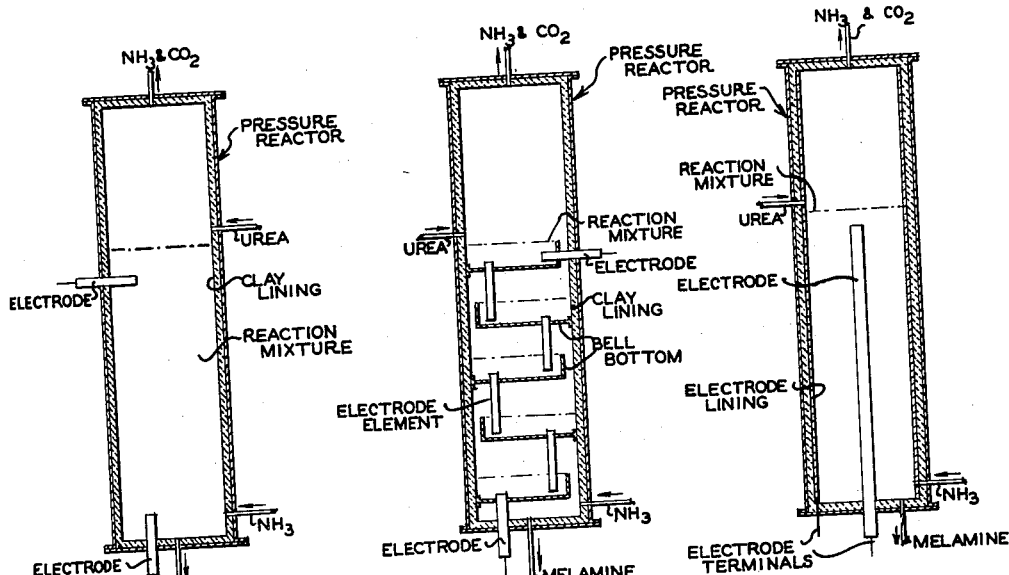
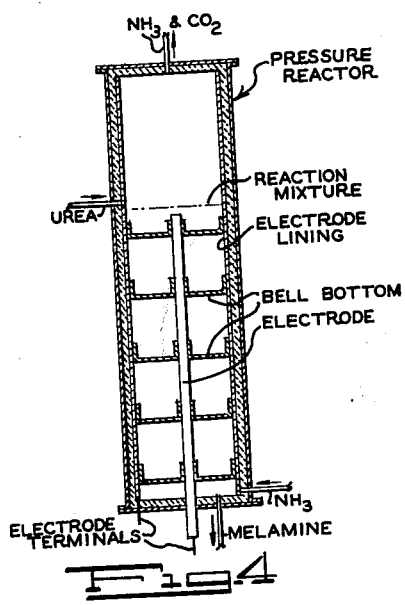
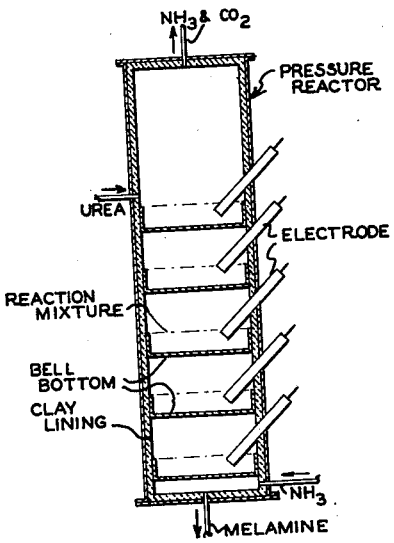

Karl Schmitt, Herne, Westphalia, and Josef Disteldorf and Hans-Jurgen Haage, Wanne-Eickel, Germany, assignors to Hibernia-Chemie G.m.b.H., Wanne-Eickel, Germany, a German corporation
Filed May 7, 1962, Ser. No. 193,020
Claims priority, application Germany May 9, 1961
8 Claims. (Cl. 260—249.7)

The present invention relates to a process for the production of melamine by heating urea under pressure, and more particularly to such a process using the specific resistance heat of urea generated by the passage of an electric current through the urea.

Conventionally, melamine is produced by heating urea under pressure, as for example by introducing urea, preferably in the form of a melt, into a pressurized reactor, whereby through external heating of the reactor, simultaneously with the autogenous or self-generated pressure within the reactor, the required reaction conditions are brought about. Usually, the temperature is maintained at about 400° C., and for sufficient degrees of conversion, a time of stay of about 30 minutes up to 2 hours is necessary. In order to stabilize the reaction, pressures of about 100 atmospheres are generally used.

It is also known that the reaction of urea under pressure to form melamine may be favorably influenced by the addition of certain catalysts. For example, the addition of certain metals, particularly iron, in the form of the pure metal, or of the oxide, or of a salt thereof, etc., enhances the reaction.

Up to the present, melamine has not been produced successfully on a large scale, using the afore-described processes. Essentially, two main difficulties exist which prevent the application of the conventional melamine processes to large scale industrial undertakings, i.e. the corrosion problem and, closely connected therewith, the problem of supplying sufficient energy or heat for carrying out the reaction in the desired manner. It is known in this connection that the reaction energy $\Delta H_{400°\ C.} = +70$ kcal. per formula convention for the reaction equation:

$$6NH_2CONH_2 \rightarrow 1\ melamine + 3CO_2 + 6NH_3$$

It is obvious from the foregoing that in order to heat the urea and in order to provide sufficient reaction heat for the conversion to melamine, considerable energy is required, which energy must be supplied to the urea in a more or less complete and direct manner. Therefore, with respect to the reaction vessel used, a very good heat exchange must be provided. Particularly because of the prevailing pressure conditions for carrying out the melamine reaction, such heat exchange may only be provided where the reaction vessel is constructed of metallic materials. Additionally, sufficient heat exchange surface must exist between the reaction vessel and the urea melt in order to uniformly distribute the heat for the desired reaction. However, it is well recognized that under the particular reaction conditions of the melamine formation, metallic materials are very strongly attacked, and therefore the reaction vessels become corroded and thus lose their attractiveness. This objectionable result is particularly applicable where iron reaction vessels are used.

Attempts have been made to overcome this drawback of corrosion by lining the reaction vessel with pure metals, such as gold, silver, titanium, tantalum, etc. and also by using linings of highly alloyed steel, such, as for example, those which contain nickel, chromium, vanadium, molybdenum, etc., with iron being present only in comparatively trace amounts. Corrosion protection afforded in this manner, however, is incomplete, since such reaction vessels have only limited capacity due to the high cost of the metallic materials employed. Therefore, attempts to line the reaction vessel with pure or noble metals or highly alloyed steels must fail where large scale industrial processes are concerned, due to the prohibitive cost for the installations alone.

Sporadically, attempts have been made to provide reaction vessels for the melamine reaction wherein the vessel is lined with glass. Of course, for widespread industrial processes, developments of this kind must be eliminated from consideration, especially because of the impracticality of construction and the lack of durability in use of glass-lined apparatus.

In summary, it must be concluded that while numerous attempts have been made to solve the problem of carrying out the production of melamine by way of specialized reactors containing linings of non-corrosive materials, these attempts have not led to any success in practice because of the impracticality and/or economic unfeasibility of the undertakings contemplated.

As for the use of non-metallic materials in place of metallic materials for the reaction vessel, up to the present this has not been considered due to the fact that no provision was known for introducing the necessary total energy and heat required for the conversion, in a sufficiently effective manner to permit industrial scale apparatus to be operated. While it has been proposed already to line with graphite the reaction vessel which is to be charged with the melamine forming substance, this technique is objectionable mostly because of the insulation properties of such non-metal. Specifically, heat cannot be transferred to the reaction mixture through the walls of the reaction vessel as in the case of metallic vessels, but instead, the required heat must be supplied to the individual ingredients of the reaction mixture themselves. In this regard, such heat may be contributed by introducing into the reaction vessel ammonia which has been preheated to a temperature between about 500 and 550° C. It is self evident that this procedure still cannot solve the problem of providing as uniform as possible a heat supply nor a sufficient heat supply for the purpose intended. By utilizing the foregoing procedure of introducing pre-heated ammonia, the attainable conversions to melamine are extremely low, and of course, this procedure suffers from the obvious drawback that the pre-heating of ammonia to such high temperatures is beset with the danger of a decomposition or explosion.

It is an object of the present invention to overcome the foregoing drawbacks and to provide a process for the production of melamine utilizing the specific resistance heat of urea.

It is a further object of the invention to provide a process for the production of melamine by heating urea under pressure by passing an electric current through the urea to generate heat therein as a function of the specific resistance thereof to the current being passed therethrough.

Other and further objects of the invention will become apparent from a study of the within specification and the accompanying drawings in which:

FIG. 1 is a schematic elevation of a vertical reactor through which urea and ammonia are passed in counter-current to one another, the heating being carried out by passing a current between electrodes positioned in the reaction mixture;

FIG. 2 is a schematic elevation of a vertical reactor in accordance with a further embodiment of the invention in which a greater number of electrode elements are positioned within the reaction mixture;

FIG. 3 is a schematic elevation of a vertical reactor in accordance with another embodiment of the invention containing a centrally disposed electrode within the reaction mixture, with the opposing electrode being defined by a suitable lining on the inside wall of the reactor;

FIG. 4 is a schematic elevation of a further embodiment of a vertical reactor in accordance with the invention, wherein bell-bottom inserts are used to separate the reaction mixture into a number of subdivisions; and FIG. 5 is a schematic elevation of a vertical reactor in accordance with an alternate embodiment of the invention wherein individual electrodes are inserted into individual subdivision zones of the reaction mixture.

It has been found in accordance with the present invention that an improved process for the production of melamine by heating urea under pressure may be provided, which comprises carrying out the heating of urea under pressure by passing an electric current through the urea to generate heat therein as a function of the specific resistance thereof to the current being passed therethrough for forming melamine. Specifically, the heating is carried out in a closed zone having a non-metallic lining, in order to avoid corrosion, and temperatures may be used which range between about 300 and 500° C., whereas pressures may be used which range between about 50 and 300 atmospheres absolute. For best results, the electric current used is in the form of alternating current.

In accordance with a preferred embodiment of the invention, the heating is carried out in the presence of ammonia, and the urea is passed along a reaction path in counter-current to the ammonia, whereby melamine produced under the reaction conditions may be recovered from one end of the reaction path while carbon dioxide and ammonia produced as by-products may be recovered from the other end of the reaction path.

Suitably, the melamine production may be carried out in the presence of a metallic catalyst if desired, such as a catalyst consisting of a base metal, a base metal oxide, and/or a base metal salt, such as iron oxide, etc.

Advantageously, the melamine formed by the reaction is recovered in liquid form while the carbon dioxide and ammonia are recovered in gaseous form, and for this reason a vertically extending reactor is preferred, wherein the urea is added to the upper end thereof and the ammonia is added to the lower end thereof, whereby the heavier urea will flow downwardly while the gaseous ammonia will bubble upwardly through the reaction mixture for maximum contact between the ingredients.

Advantageously, the carbon dioxide and ammonia in gaseous form may be recovered from the upper end of the vertical reactor and conducted to a cooling step, preferably without change in pressure, and thereafter converted to urea in the conventional manner, so that the urea formed thereby may be recycled back to the melamine process step, for the conservation and efficiency of the over-all reaction.

In accordance with the preferred embodiment of the invention, an improvement is provided in the process for the production of melamine by heating urea under pressure in a closed reaction zone having a non-metallic lining, such improvement contemplating the carrying out of the heating of the urea melt under pressure in the presence of gaseous ammonia to produce melamine, carbon dioxide, and ammonia, by passing an alternating current through the reaction mixture to generate heat as a function of the specific resistance of urea to the current, the temperature being maintained between about 300 and 500° C., and preferably 350 to 450° C., and the pressure being maintained between about 50 and 300 atmospheres absolute, and preferably about 100 atmospheres absolute. The reaction may be carried out for a period of from about 2 minutes to 2 hours, although a period of at least 30 minutes is desirable, unless stronger reaction conditions and/or the use of a catalyst is contemplated. Alternating current of about 50 hertz has been found to be particularly suitable and where a catalyst is to be used, 0.5% by weight of iron oxide has proved to be efficient enough for the reaction to be maintained at about 370° C.

Thus, the present invention permits the required energy to be supplied to the urea in such a manner that the entire corrosion problem which beset the use of metallic reactors is completely eliminated. Practically speaking, this is only possible where the energy is introduced into the urea melt by way of electricity. The lining of the reaction vessel, as well as other parts of the apparatus, which may be exposed to corrosion, may be made of non-metallic materials which are inert with respect to the reactants under the reaction conditions, since the supply of energy necessary for heating up the reaction materials and for carrying the reaction at least in part, is effectively produced within the reaction vessel itself by passing electricity through the reaction mixture, and specifically the urea. Actually, the urea and/or the reaction mixture will serve as the electrical resistance for the current conducted therethrough whereby heat will be generated in an amount sufficient for the desired purpose. Furthermore, because of the nature of the heat generation, the required reaction heat will be uniformly distributed throughout the interior of the reaction vessel.

In spite of past considerations, it has been found surprisingly that electrical conductivity not only exists in urea, but exists specifically to a degree that it is possible to use urea directly as current conductor and thereby as resistance heating means. The discovered behavior of urea in this regard is even more surprising since, as far as is evident in the literature up to the present, data do not exist which indicate the conductivity of urea melts and, on the other hand, by reason of the known electrical behavior of similar organic substances, no conclusion could have been drawn reasonably that the conductivity of urea melts would attain the discovered order of magnitude.

Specifically, in accordance with the invention, urea may now be employed directly for heating the reaction mixture by immersing electrodes, which are insulated with respect to the reactor walls, in a suitable manner into the melt and causing current to flow between the electrodes by applying a suitable voltage. If desired, the reactor wall or lining may serve as an electrode. In any case, the heat required for the reaction is directly produced in the urea itself, whereby the most direct and homogeneous heat transfer possible will occur.

The carrying out of the melamine process in accordance with the invention is favorably aided by the fact that the gaseous constituents, such as the ammonia and carbon dioxide possess a resistance to current flow which is higher by several orders of magnitude than the resistance to current flow of the urea melt itself. Accordingly, the current through the reaction mixture will flow chiefly through the urea, whereby heat will be developed chiefly where the urea is situated, i.e. where lower or less complete conversion has taken place. For example, urea possesses a specific resistance at 200° C. of only about 15 ohm-centimeters, while in contrast thereto, melamine possesses at 400° C. a specific resistance of 5,000 ohm-cm. The favorable conditions with respect to urea are even more favorable at higher temperatures. In this regard, the gas phase of $NH_3:CO_2$ which is in the molar ratio of approximately 2:1, corresponding to the reaction gases of the melamine production, when standing under a pressure of 20 atmospheres, exhibits at 200° C., a specific resistance of about $10^6$ ohm-cm. In order to terminate or minimize undesired electrolytic side reactions and decompositions of manifold nature, alternating current is used appropriately for the heat generation, even at a frequency greater than 50 Hz., if desired.

Advantageously, as aforesaid, by reason of the specific form of heat generation, it is possible to avoid the use of a metallic lining for the reactor vessel interior walls, whereby it has become possible not only to line the reactor walls with non-corrosive and non-sensitive material, but also to omit the substantially more sensitive heat exchanger apparatus within the reactor necessary under former circumstances.

The specific type of lining for the reactor walls depends substantially upon whether the reactor interior wall is to be used as an electrode for the current or not. In the instance where such wall is to be used as an electrode, such materials are used, preferably, which conduct the electric current well, including in particular coal, graphite, carbonaceous materials, and the like, simple carbon in shaped solid form being expedient for the purpose. Where the reactor walls are not used as an electrode, only such materials may be used as reactor lining which do not conduct the electric current to a greater degree than the melt itself. Appropriately, such non-conductor linings include insulator materials, such as those containing natural clays, i.e. materials containing silicon, such as kaolin and the like, materials containing aluminum, such as corundum, and the like, materials containing magnesium, such as magnesite, and the like, etc.

Because of the provision for carrying out the melamine production using electrical current for heating purposes, it is now possible to carry on large scale industrial melamine production without being confronted with the usual corrosion difficulties. Of course, due to the fact that electricity is used for the heating, the energy supplied for the process may be regulated very simply and with versatility. The energy transmission occurs practically without inertia or current loss. By omitting the heat exchange apparatus in the interior of the reactor, the entire volume within the reactor is available for any desired manipulations, especially those of a type which are fundamentally not possible in the presence of interfering heat exchange apparatus.

In this connection, built-in bottom inserts may be provided in the reactor whereby the reaction may be carried out in accordance with the counter-current principle for attaining not only more rapid and higher transformations, but also separate reaction paths for the liquid phase and the gaseous phase. As aforesaid, where urea in melt form is introduced into the upper portion of a vertical reactor, such urea because of its weight, will gravitate downwardly through the aforementioned built-in bottom elements, whereas the gases which form will flow upwardly in opposite direction, perhaps under the inclusion of additional ammonia for stabilization, the gases also passing through the built-in bottom elements. Advantageously, the urea is added at a point above the level of the reaction mixture, and the gas is added to the bottom portion of the reactor at a point above the outlet for the melamine. It has been found that the gases which leave the head of the reactor are free from condensed constituents, whereby it is possible to further work up this urea-free and melamine-free gaseous mixture consisting of ammonia and carbon dioxide, under intermediate cooling, such as with liquid amide, under a reaction temperature suitable for urea synthesis. While such urea synthesis may be carried out in a separate arrangement, such arrangement may be appropriately connected with the melamine reactor without loss of pressure in the over-all system. In this manner, urea formed in the urea synthesis of the ammonia and carbon dioxide gas, in accordance with conventional procedures, may be recycled to the melamine reactor to obtain a higher degree of efficiency for the over-all conversion.

The usual conditions for the melamine synthesis are employed, of course, contemplating temperatures between about 300 and 500° C., and preferably between about 350 and 450° C., with pressures within the range of about 50 to 300 atmospheres absolute, and preferably around 100 atmospheres absolute. The time of stay of the reactants in the reactor will depend upon the particular conditions and generally ranges between about 2 minutes and 2 hours, whereby a continuous process is rendered possible. If necessary, the reaction may be favorably influenced by the addition of catalysts, in the known manner, such as those described in German Patent 955,685.

Referring to the drawing, the various vertically extending reactors illustrate fundamental forms which may be used wherein the reactivity of the urea melt is directly utilized for heat generation. Thus, in all of the reactors shown in FIGS. 1–5, urea is added at a point above the level of the reaction mixture, whereas ammonia for stabilizing the system is added near the bottom of the reactor, but at a point above the lower end thereof where the melamine produced is drawn off. Ammonia and carbon dioxide in gaseous form are recovered from the head of the reactor for suitable further work up and possible recycling in the form of urea. In each instance, current is supplied directly to the melt by suitable electrode arrangements. In FIG. 1, one electrode is placed through the wall of the reactor near the upper level of the reaction mixture whereas the opposing electrode is placed in the bottom wall of the reactor so that maximum current passage through the solution will be achieved. The electrodes are connected suitably to a source of alternating current of magnitude sufficient to cause the desired heating under the reaction conditions, such as a source of 6 volts at 1,000 amperes, i.e. 50 Hz. (50 cycles per second).

In FIG. 2, bottom element built-in installations are provided, similar to the bell bottoms employed in distillation towers. In addition to the electrode elements protruding through the walls of the reactor in a manner similar to the system shown in FIG. 1, electrode elements extending downwardly are provided so that the current conduction between the various electrode elements will be assured only by means of the intermediate reaction mixture disposed in the bell bottom installations. Current must pass through the reaction mixture itself disposed in each of the bell bottoms in order to complete the circuit from the uppermost electrode protruding through the reactor wall to the lowermost electrode extending through the bottom wall of the reactor. In this instance, an upper level for the liquid reaction mixture is not attained, but rather each of the bell bottom installations serves to hold a portion or pool of reaction mixture subjected to the passage of current therethrough, whereby the desired heating and conversion is attained. Of course, liquid reaction mixture will overflow from one bell bottom installation to the next installation therebelow and the converted reaction mixture will be drawn off from the bottom of the reactor. In reverse direction, the counter-current flow of ammonia is achieved since the ammonia will bubble upwardly between the bell bottom installations in the same manner as the ammonia and carbon dioxide which represent by-products of the reaction. These gaseous constituents are readily recovered from the head of the reactor.

In the embodiments of FIGS. 1 and 2, the reactor walls are provided with non-conductive materials, such as natural clay materials, since specific electrode bodies are provided for the current passage. In both cases, a series connection is achieved since the current passing from one electrode to the other must pass, in turn, through the appropriate portion of the reaction mixture therebetween. While a simple arrangement is provided in the embodiment of FIG. 1, by the use of bell bottoms in the embodiment of FIG. 2, an intensive intermixing of the various phases is assured while the counter-current principle is preserved as well as the plug or stopper principle which controls the downward flow and upward flow of reactants by reason of the built-in elements. Such built-in elements permit the reaction to be carried out with proper control of flow rates to obtain very definite times of stay.

In FIG. 3, the pressured reactor is provided with an electrode lining of carbon, graphite, or the like while a central electrode extends through the reaction mixture from the bottom wall of the reactor. In this instance, current will flow through the solution between the centrally disposed electrode, which may be of carbon or graphite, for example, and the reactor wall lining, which is of electrically conductive material, so as to form an electrode lining.

In FIG. 4, an arrangement is shown which combines the features of the embodiments of FIGS. 2 and 3, wherein both the centrally extending electrode and the bell bottoms or built-in elements are provided. An electrode lining is used in this instance so that suitable conduction between the electrode surfaces will occur through the reaction mixture. By reason of the bell bottom installations, a uniform and regulated flow rate and an intimate intermixing of the ingredients will be provided.

In the embodiments of FIGS. 3 and 4, a parallel connection is used whereby the current passes between the electrodes through the solution at any point along the extent of the solution or melt. In the case of the embodiments of FIGS. 1 and 2, on the other hand, the current could pass along only one course between the spaced apart electrodes protruding through the reactor wall.

In FIG. 5, bell bottoms are provided to subdivide the reactor into separate sub-zones, each having an electrode in contact with the liquid reaction mixture thereat. The electrodes protrude through the reactor wall and serve to supply electrical current to the individual zones, respectively, of the reactor for electrically heating the melt in such zone independently of one another depending upon the specific energy requirement in the various sub-zones. Of course, since less urea will be found in the lower sub-zones, the energy requirement for converting the remaining urea will vary accordingly.

In each instance, as will be appreciated by the artisan, the electrodes protruding through the reactor wall are insulatedly mounted on such wall and prevent leakage through the reactor thereat. Furthermore, where bell bottom installations are used, these are similar in construction to the bell bottoms used in distillation towers, whereby in the embodiments of FIGS. 2, 4, and 5, more intensive intermixing of the various phases is assured and very definite control of the flow rate and residence time of the ingredients within the reactor.

In accordance with the invention voltages can be used in the range from 1 to 200 volts, the frequencies being in the range from 50 to 1000 Hz., and the amperages being a result of the geometry and the voltage of the electrodes.

The following examples are set forth for the purpose of illustrating the invention, and it is to be understood that the invention is not to be limited thereby.

*Example 1*

A pressure reactor is used having a volume of 21 liters, the reactor being made from $V_4A$ Extra steel, having a titanium overlayer. The inside wall of the reactor is lined with graphite, the lining having a thickness of 5 cm. Through the lower end of the reactor, a centrally positioned carbon electrode is provided, such electrode terminating within the reactor at a point shortly before the top end thereof. For mechanical stability, the centrally positioned electrode is provided with a titanium core. The voltage needed in order to heat the reaction mixture is 6 volts at a current of 1,000 amperes, and this is obtained by applying a normal alternating current of 50 cycles/sec. (50 Hz.) between the reactor wall and the centrally positioned electrode, i.e. through the urea melt disposed in the reactor. The current supply is regulated so that a maximum temperature of 450° C. prevails in the reactor. Under these conditions, a transformation of 97% by weight of urea melt into melamine occurs, where 16 kg. of urea melt per hour, pre-heated in the usual manner to 200° C., are pumped into the reactor at a point near the upper end thereof. The pressure release for the autogeneous or self-generated pressure which occurs during the reaction may take place by way of a throttle valve, such that a pressure of about 100 atmospheres absolute is maintained.

*Example 2*

Under the same conditions as set forth in Example 1, the same reaction may be carried out, with the exception that an addition of 0.5% by weight of iron oxide as catalyst, based upon the urea melt charged, is used. The same output at the same transformation percent as obtained in Example 1 occurs in this instance, already at a temperature of 370° C., with the alternating current being correspondingly slightly adjusted to avoid the generation of excess heat.

*Example 3*

The procedure of Example 1 is repeated in a reactor which is provided with a centrally positioned electrode extending downwardly through the top end of the reactor rather than through the bottom end thereof. The centrally positioned electrode terminates slightly above the lower end of the reactor. Under these conditions, the same results as set forth in Example 1 are obtained using the same current, amount per hour of urea, temperature and pressure.

What is claimed is:

1. Process for the production of melamine by heating urea under pressure, which comprises carrying out the heating of urea under pressure by passing an electric current through the urea to generate heat therein as a function of the specific resistance thereof to the current being passed therethrough for forming melamine.

2. Process according to claim 1 wherein the heating is carried out at a temperature between about 300 and 500° C. and a pressure between about 50 and 300 atmospheres in a closed zone having a non-metallic lining.

3. Process according to claim 2 wherein the electric current is alternating current.

4. Process according to claim 3 wherein the heating is carried out in the presence of ammonia by passing urea along a reaction path in countercurrent to the ammonia, and recovering the melamine produced.

5. Process according to claim 4 wherein the heating is carried out under pressure in the presence of a metallic catalyst selected from the group consisting of base metals, base metal oxides, and base metal salts.

6. Process for the production of melamine by heating urea under pressure, which comprises carrying out the heating of urea melt under pressure in a closed reaction zone having a non-metallic lining in the presence of ammonia by passing an electric current through the urea to generate heat by the specific resistance of urea to the current and to form melamine, carbon dioxide, and ammonia, and collecting the melamine in liquid form separately from the carbon dioxide and ammonia in gaseous form, the heating being carried out at a temperature between about 300–500° C. and a pressure between about 50–300 atmospheres for a period of from about 2 minutes to 2 hours, and the carbon dioxide and ammonia in gaseous form being recovered, cooled without change in pressure and converted into urea, and the urea formed thereby recycled back to the melamine process step.

7. Process according to claim 4 wherein the temperature is maintained at about 350 to 450° C. and the pressure is maintained at about 100 atmospheres, the residence time being between about 2 minutes and 2 hours and the alternating current being at about 50 hertz.

8. Process according to claim 7 wherein the heating is carried out at about 370° C. in the presence of 0.5% by weight iron oxide as catalyst.

References Cited in the file of this patent

UNITED STATES PATENTS

| | | |
|---|---|---|
| 1,400,959 | Koetschet | Dec. 20, 1921 |
| 2,485,276 | Gerbes | Oct. 18, 1949 |
| 2,566,224 | Mackay | Aug. 28, 1951 |
| 2,575,497 | Mackay et al. | Nov. 20, 1951 |
| 2,972,614 | Disteldorf | Feb. 21, 1961 |

FOREIGN PATENTS

| | | |
|---|---|---|
| 540,286 | Canada | Apr. 30, 1957 |
| 792,604 | Great Britain | Apr. 2, 1958 |